US009488238B2

(12) United States Patent
Anderson (10) Patent No.: US 9,488,238 B2
(45) Date of Patent: Nov. 8, 2016

(54) COMPOSITE ROTOR (71) Applicant: RASSINI FRENOS, S.A. de C.V., San Martin Texmelucan, Puebla (MX)

(72) Inventor: Brian Anderson, South Lyon, MI (US)

(73) Assignee: RASSINI FRENOS, S.A. DE C.V., Puebla (MX)

( * ) Notice: Subject to any disclaimer, the term of this patent is extended or adjusted under 35 U.S.C. 154(b) by 17 days.

(21) Appl. No.: 14/345,876

(22) PCT Filed: Sep. 19, 2012

(86) PCT No.: PCT/US2012/055975
§ 371 (c)(1),
(2) Date: Mar. 19, 2014

(87) PCT Pub. No.: WO2013/043634
PCT Pub. Date: Mar. 28, 2013

(65) Prior Publication Data
US 2014/0326551 A1 Nov. 6, 2014

Related U.S. Application Data (60) Provisional application No. 61/536,182, filed on Sep. 19, 2011.

(51) Int. Cl.
*F16D 65/12* (2006.01)
*B22D 19/00* (2006.01)
(Continued)

(52) U.S. Cl.
CPC ............ *F16D 65/128* (2013.01); *B22D 19/00* (2013.01); *B22D 19/0081* (2013.01);
(Continued)

(58) Field of Classification Search
CPC .. F16D 65/12; F16D 65/123; F16D 2065/13;
F16D 2065/1304; F16D 2065/134; F16D 2065/1344; F16D 2065/1384; F16D 2065/1392; F16D 2200/0082; F16D 2250/0007; F16D 2250/0046; F16D 65/127; F16D 65/128; F16D 2065/1316; F16D 2065/1376; F16D 2200/0013; F16D 2250/0015; B22D 19/00; B22D 19/0081
USPC .................................... 188/218 R, 218 XL
See application file for complete search history.

(56) References Cited

U.S. PATENT DOCUMENTS 4,035,895 A    7/1977  Lester
5,823,303 A *  10/1998 Schwarz et al. ....... 188/218 XL
(Continued)

FOREIGN PATENT DOCUMENTS

WO    WO-2009137101 A2 *  11/2009

OTHER PUBLICATIONS

Written Opinion of the International Searching Authority, Case No. PCT/US2012/55975, dated Dec. 6, 2012.

*Primary Examiner* — Melody Burch
(74) *Attorney, Agent, or Firm* — Cantor Colburn LLP (57) ABSTRACT A brake disc arrangement is provided. The brake disc arrangement includes a mounting section, a brake plate section and a transitional interface positioned between the mounting section and the brake plate section and configured to attach the brake plate section to the mounting section. The transitional interface includes at least one extension extending radically from an outer circumference of the mounting section, the at least one extension having a cross-sectional configuration shaped as an I-Beam or other shape having at least two spaced apart projections on opposite side of the extension such that a vent gap is formed between the projections.

9 Claims, 8 Drawing Sheets (51) Int. Cl.
*F16D 65/00* (2006.01)
*F16D 65/02* (2006.01)

(52) U.S. Cl.
CPC ........... *F16D 65/12* (2013.01); *F16D 65/127* (2013.01); *F16D 2065/1316* (2013.01); *F16D 2065/1376* (2013.01); *F16D 2065/1384* (2013.01); *F16D 2200/0013* (2013.01); *F16D 2250/0015* (2013.01)

(56) References Cited

U.S. PATENT DOCUMENTS

| | | | |
|---|---|---|---|
| 2006/0086579 A1* | 4/2006 | Gerber | 188/218 XL |
| 2006/0243547 A1* | 11/2006 | Keller | 188/218 XL |
| 2007/0181389 A1 | 8/2007 | Moore et al. | |
| 2010/0089710 A1* | 4/2010 | Franke | 188/218 XL |
| 2011/0061980 A1 | 3/2011 | Anderson | |
| 2011/0259682 A1* | 10/2011 | Mueller | 188/218 XL |
| 2011/0266103 A1* | 11/2011 | Mueller | 188/218 XL |

\* cited by examiner

COMPOSITE ROTOR

CROSS-REFERENCE TO RELATED APPLICATION(S)

This application claims the benefit of priority to PCT Application No. PCT/US2012/55975 filed Sep. 19, 2012, which claims the benefit of priority to U.S. Provisional Patent Application Ser. No. 61/536,182, filed Sep. 19, 2011, in the United States Patent and Trademark Office, which are both incorporated herein by reference in their entirety.

BACKGROUND OF THE INVENTION

Brake discs that conventionally are formed of a combination of a mounting portion and a brake plate portion employ, in some known arrangements, a continuous skirt extending radially outward of the mounting portion, the continuous skirt engaging a brake plate portion (i.e., brake band). The mounting portion is sometimes referred to as a "rotor hat," due to its raised central portion and a substantially cylindrical portion extending axially therefrom. This combination, particularly with a continuous skirt extending radially from the cylindrical portion and disposed axially distal from the central portion gives the general appearance of a hat. It is also known as the "mounting bell."

The engagement between the continuous skirt and the brake plate portion is achieved in a number of ways. One engagement method involves direct communication between the mounting portion and the brake plate portion, thereby forming a continuous product. In other known connection arrangements, fingers radiate radially inward from the brake plate portion and are connected by fasteners to the continuous skirt. The radially inwardly extending fingers can be formed integrally with the brake plate portion. In these known arrangements, the mounting portion and the brake plate portion are so firmly attached to one another that they operate as a single element.

It is also known that heating of the brake plate portion during manufacture and use in a motor vehicle will cause various forms of warpage and deformation, particularly including axial deformation. One approach to alleviating this problem is to employ radially inwardly directed fingers, which are formed integrally with the brake plate portion, and communicate with the mounting portion. The fingers, however, are able to be displaced radially, thereby arguably enabling radial dilation of the brake plate portion so as to accommodate the radial deformation. However, it is desirable to reduce vibration during braking and increase heat dissipation.

SUMMARY OF THE INVENTION

According to one aspect of the invention, a brake disc arrangement is provided. The brake disc arrangement includes a mounting section, a brake plate section and a transitional interface positioned between the mounting section and the brake plate section. The transitional interface is configured to attach the brake plate section to the mounting section includes at least one extension extending radially from an outer circumference of the mounting section, the at least one extension having a cross-sectional configuration shaped as an I-Beam.

According to another aspect of the invention, a brake disc arrangement is provided. The brake disc arrangement includes a mounting section formed of a metal and a transitional interface having a plurality of extensions extending radially outward of said mounting portion, at least some of the extensions of the plurality of extensions including a first side facing a first axial direction and a second side facing a second axial direction opposite to the first axial direction, the first side having at least two first fins spaced apart and extending in the first axial direction and a first vent gap formed between the at least two first fins, the second side having at least two second fins spaced apart and extending in the second axial direction and a second vent gap formed between the at least two second fins. The brake disc arrangement also includes a brake plate section attached to the transitional interface.

According to yet another aspect of the invention, a method of forming a brake disc arrangement is provided. The method includes forming a mounting section having a plurality of integrally formed radial extensions having an I-beam cross-sectional shape and casting a metal brake plate section so as to surround the radial extensions with molten metal.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a brake disc may include two primary connected sections: a mounting section 20 and a brake plate section 30. In an exemplary embodiment of the present invention, a transitional interface 100 extends between the mounting section 20 and brake plate section 30. With reference to view shown in FIG. 7 and the cross section shown in FIG. 8, in an exemplary embodiment, the transitional interface 100 includes an I-Beam cross-sectional design.

Figure 1:
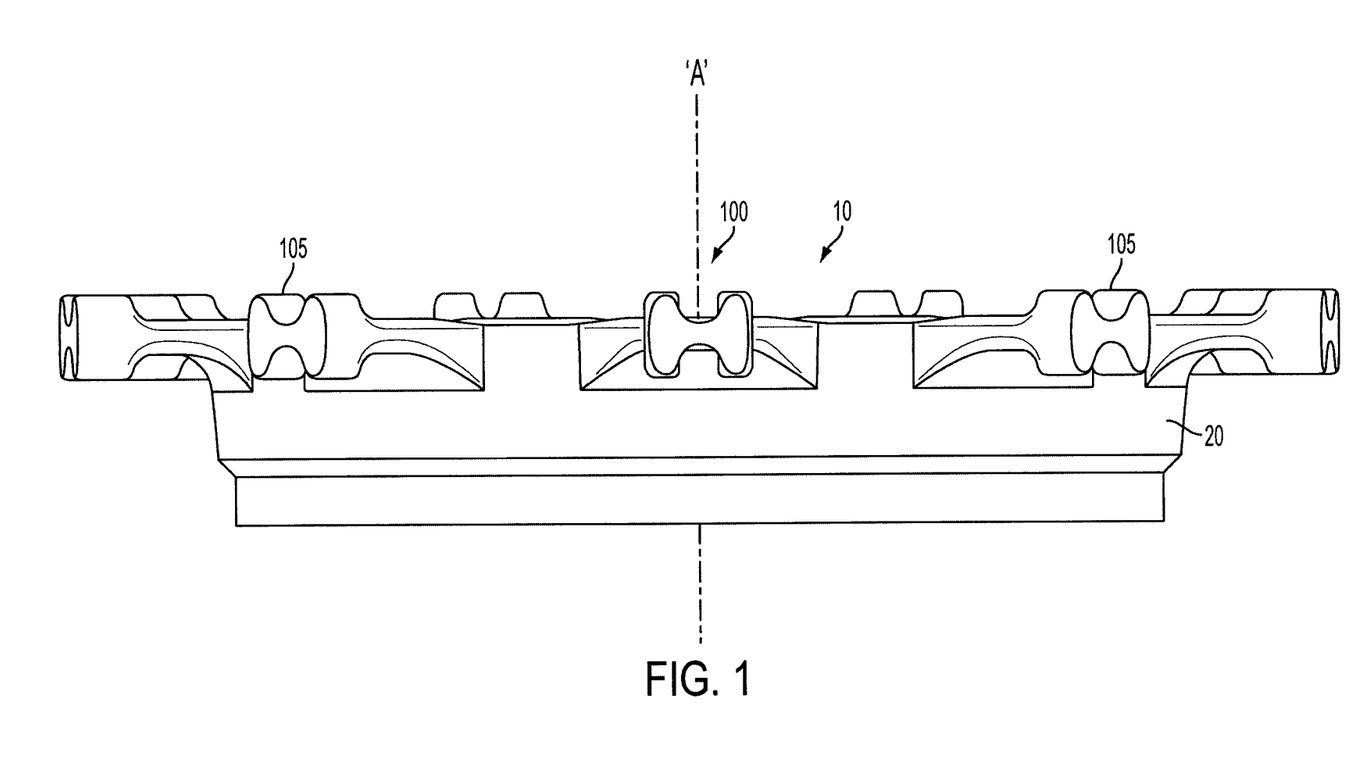
FIG. 1 shows a portion of a composite brake rotor, in accordance with one aspect of the invention.
Figure 2:
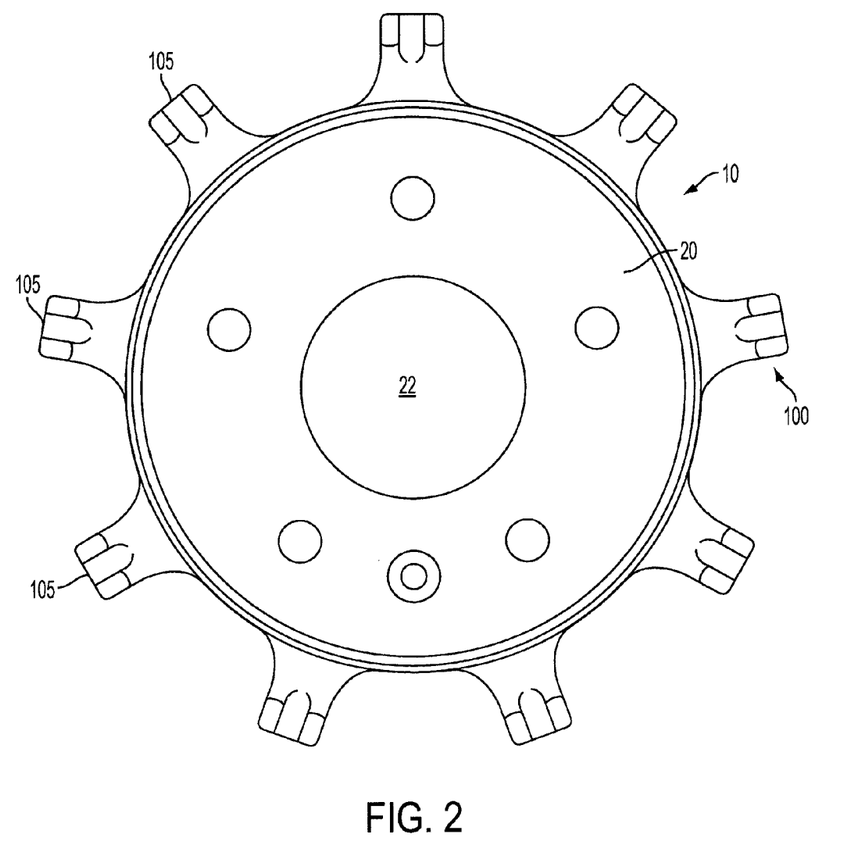
FIG. 2 shows a plan view of the portion of the composite brake rotor shown in FIG. 1.
Figure 3:
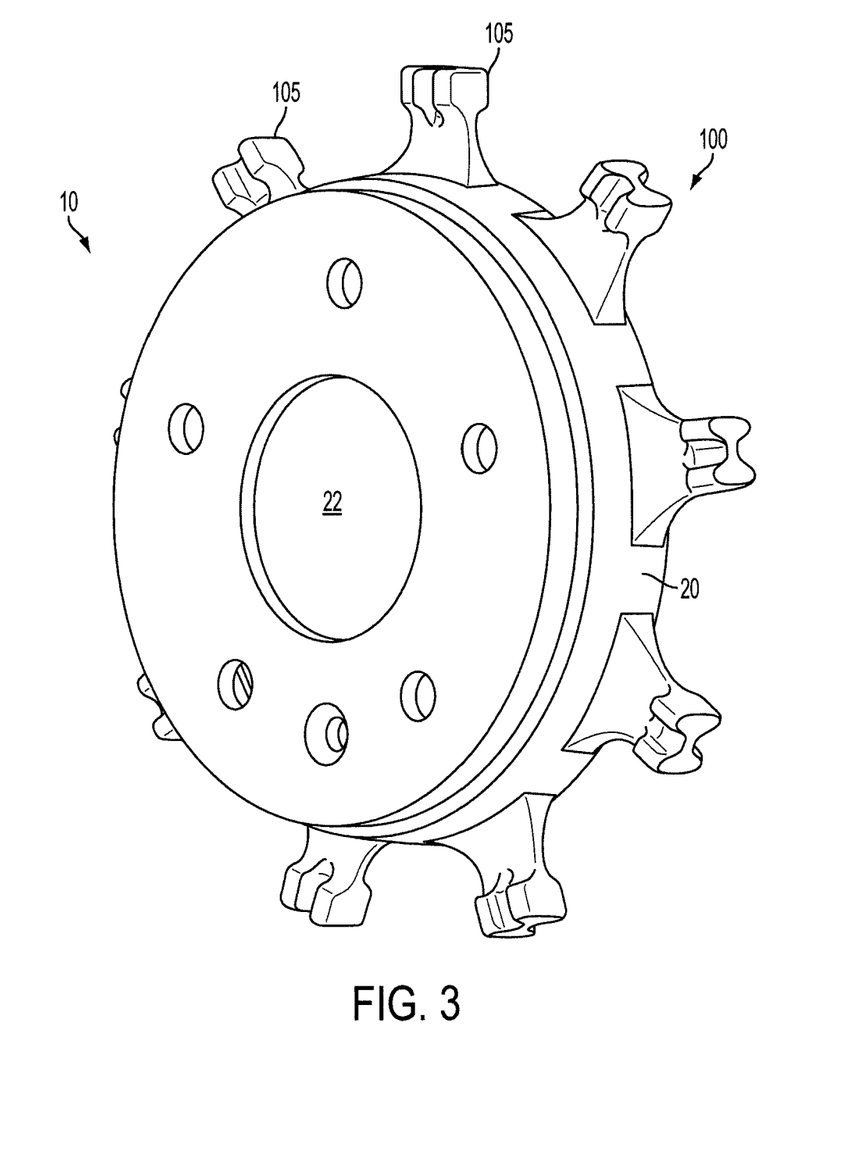
FIG. 3 is a perspective view of a portion of a composite brake rotor, in accordance with yet another aspect of the invention.

With reference to FIGS. 1-3, the mounting section 20 includes a mounting aperture 22 extending therethrough allowing the mounting section 20 to be installed on an axle (not shown) of a vehicle (not shown). The mounting section 20 is generally annular in shape and is centered about an axis 'A'. The mounting section 20 supports the transitional interface 100 about an outer circumference of the mounting section 20. The mounting section 20 may be formed by casting and can be made of gray iron, nodular iron or other suitable materials.

Figure 4:
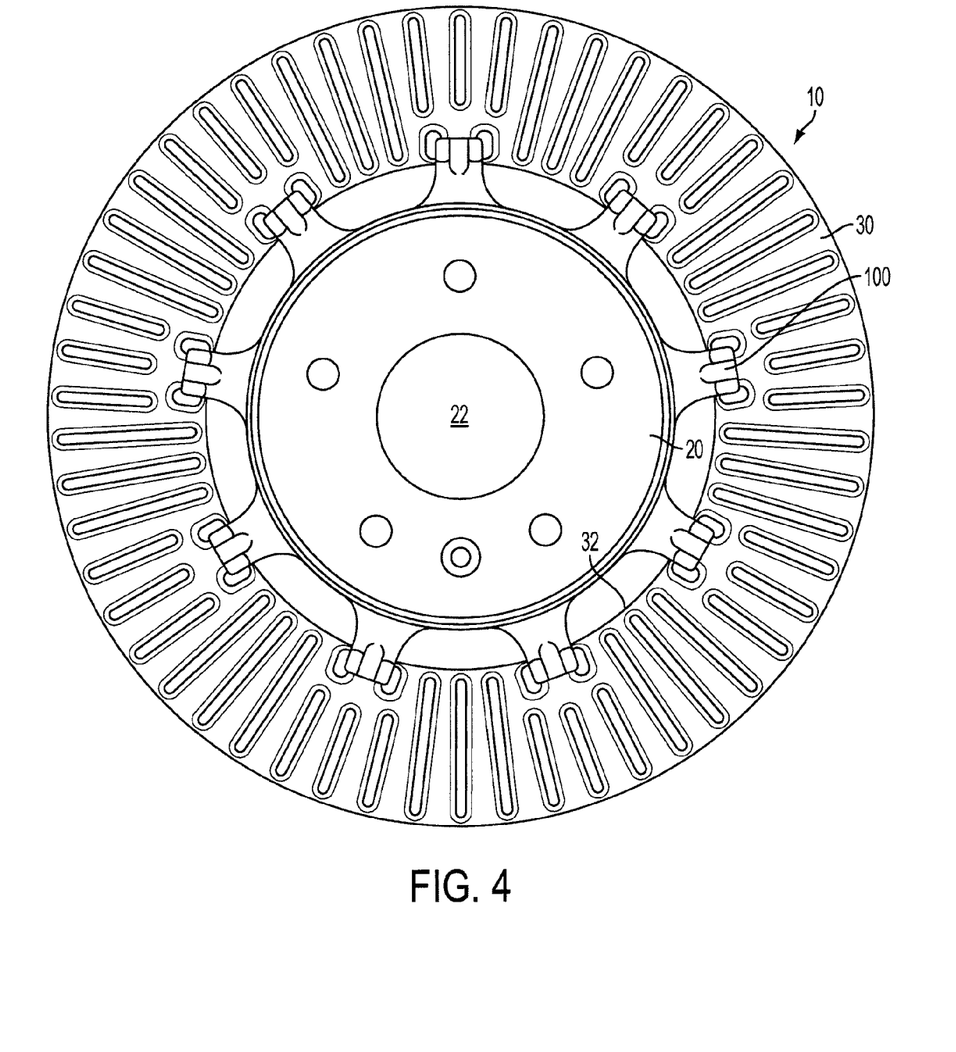
FIG. 4 is a plan view of a composite brake rotor in accordance with yet still another aspect of the invention.
Figure 5:
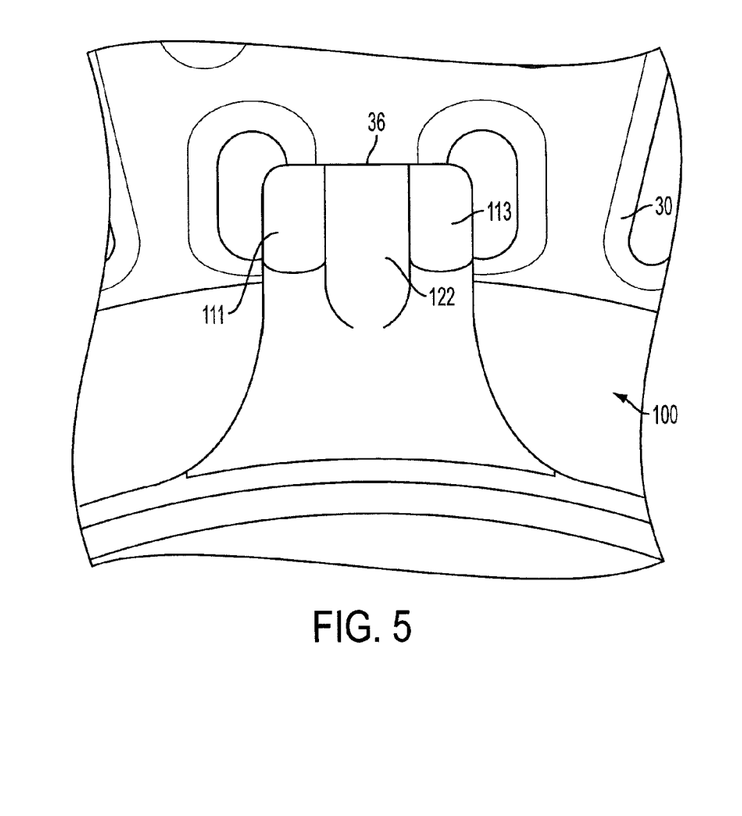
FIG. 5 is a detail view of a transitional interface of the composite brake rotor of FIG. 4.
Figure 6:
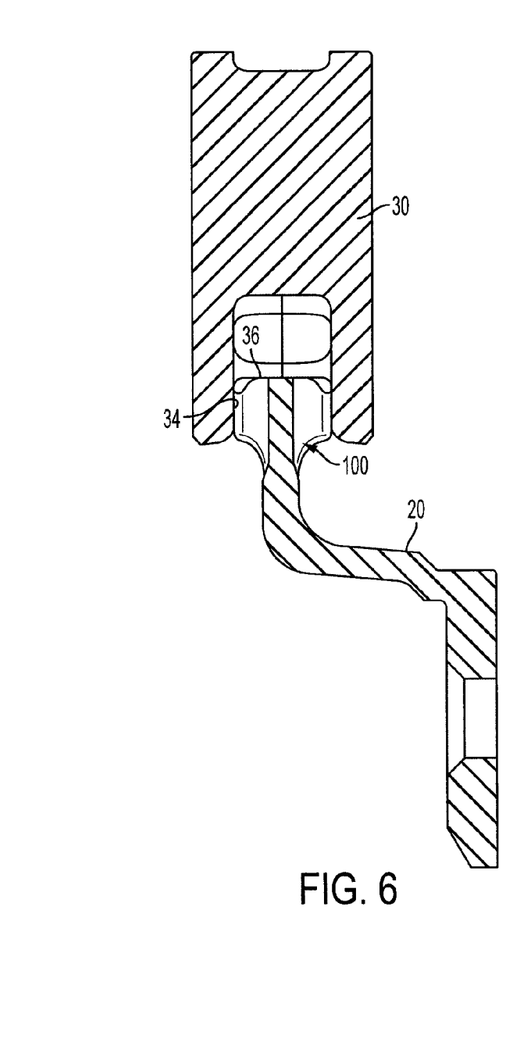
FIG. 6 is a detail view, in cross section of the transitional interface of the composite brake rotor of FIG. 4.

Referring to FIGS. 4-6, the brake plate section 30 is generally annular in shape and includes a central aperture 32. A radially inner slot 34 is formed along an inner circumferential surface of the brake plate section 30. The radially inner slot 34 is configured to receive the transitional interface 100 to attach the brake plate section 30 to the mounting section 20. Alternatively, the brake plate section 30 may be formed of two brake plates which are later joined together when mounted on the mounting section 20. A gap between the two brake plates receives the transitional interface 100 for attachment to the mounting section 20. A vent passage 36 is formed in the radially inner slot 34 or between the plates, thereby allowing air to pass through the joint formed by the mounting section 20, brake plate section 30, and transitional interface 100.

With further reference to FIGS. 1-3, the transitional interface 100 is formed along an outer circumference of the mounting section 20 and may be formed integrally with the mounting section 20. The transitional interface 100 includes a plurality of extensions 105 spaced along, and extending radially from the outer circumference of the mounting section 20. In an exemplary embodiment, the extensions 105 are substantially coplanar with one another.

Figure 7:
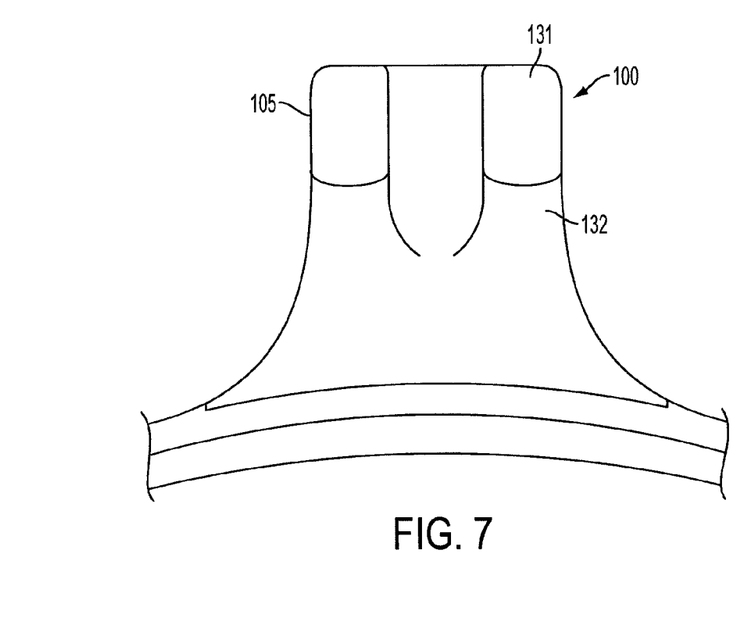
FIG. 7 is a detail view of an extension of the transitional interface, in accordance with another aspect of the invention.
Figure 8:
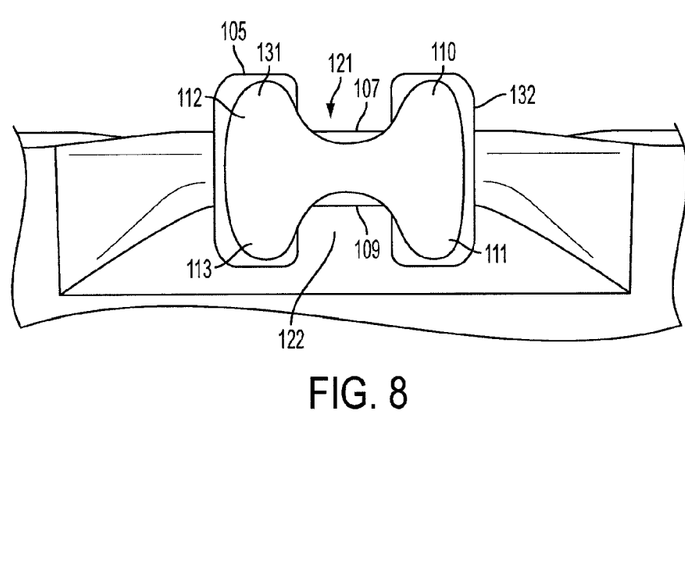
FIG. 8 is another detail view of an extension of the transitional interface shown in FIG. 7.
Figure 9:
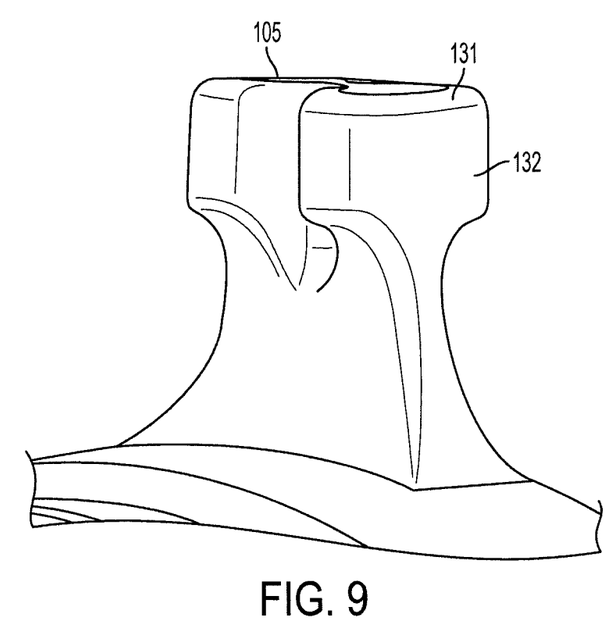
FIG. 9 is a perspective detail view of an extension of the transitional interface shown in FIGS. 7 and 8.

With reference to FIGS. 7-9, the extensions 105 include a plurality of protrusions or fins extend therefrom. In an exemplary embodiment, each extension 105 includes four fins or protrusions such that each extension 105 includes a generally I-Beam shaped cross-sectional design.

The I-Beam design of the exemplary embodiment of the extensions 105 of the transitional interface 100 refers to the shape, in cross-section, of the transition/joint between the mounting section 20 and the brake plate section 30, for example, as shown in FIG. 4. Each I-Beam shaped extension 105 includes four protrusions or fins 110, 111, 112 and 113. Fins 110 and 112 and fins 111 and 113 are each separated by vent gaps 121 and 122, respectively. Fins 110 and 112 may extend in a first axial direction from a first side 107 of the extensions 105, and fins 111 and 113 may extend in a second axial direction, opposite to the first axial direction, from a second side 109 of the extensions 105 as shown in FIG. 8.

The number of fins and vent gaps described above correspond to the exemplary embodiment where the transitional interface 100 includes extensions having the I-Beam cross-sectional design. However, it is understood that other embodiments having a different number of fins and vent gaps are envisioned also. For example, the transitional interface 100 may include extensions 105 having three, four, or more fins extending from each of the first side 107 and second side 109 of the extensions 105, with a vent gap formed between each protrusion. Accordingly, the present invention is not limited to the I-Beam configuration described in the exemplary embodiments herein. It is also understood that only some of the extensions may include the I-Beam or other configuration including a plurality of fins and vent gaps disposed therebetween. That is, the present invention is not limited to an embodiment where all extensions 105 are formed identically. Rather, some extensions 105 may be formed differently from others.

With further reference to FIGS. 5, 7 and 8, each fin 110, 111, 112, 113 includes a radially distal tip portion, also referred to as an outer diametrical tip portion 131 and a base or root portion 132. Contrary to a conventional brake disc design, where one of the braking plates is directly attached to a mounting section while the other braking plate is completely unattached, the transitional interface 100 according to an exemplary embodiment of the present invention attaches to a center of the vent passage 36 in the brake plate section 30 thereby allowing for air flow in the joint in the vent passage 36 and the vent gaps 121 and 122. That is, vent gaps 121 and 122 allow for air to pass through joints formed by the extensions 105 of the transitional interface 100 and brake plate section 30 attached thereto. In an exemplary embodiment, the transitional interface 100, including the extensions 105 and vent gaps 121 and 122, are cast along with the rest of the mounting section 20. Thereafter, outer diametrical tips 131 of the extensions 105 of the transitional interface 100 can be left as-cast, or alternatively, be machined.

The transitional interface 100 between the brake plate section 30 and the mounting section 20 is thinner in the middle with fins 110, 111, 112 and 113 that extend to the brake plate section 30, either within the radially inner recess 34, or between individual brake plates. Though the specific example referenced uses four fins or protrusions 110, 111, 112 and 113 (such that when viewed from above, i.e., the outer diameter of the disc, the appearance is that of the cross-section of an I-Beam), this invention, and the associated benefits is valid with so long as it includes at least one fin 110, 111, 112 or 113, so long as a vent gap 121 or 122 exists between the fins 110, 111, 112, 113. Of course the transitional interface 100 must also have sufficient structural integrity to connect the mounting section 20 to the brake plate section 30. Accordingly, in the exemplary embodiment shown, the base portion 132 of each extension 105 has a larger cross-sectional area than respective outer diametrical tips 131. In an exemplary embodiment, rotor 10 is manufactured or assembled by casting brake plate section 30 over the transitional interface 100 of mounting section 20. For example, the brake plate section 30 may be cast to surround the outer diametrical tips 131.

Figure 10:
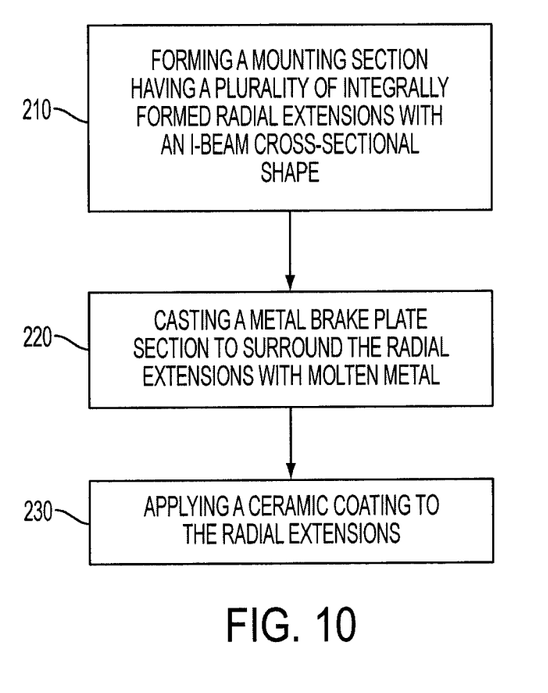
FIG. 10 is a diagram illustrating a method of forming a brake disc arrangement according to another aspect of the invention.

Referring to FIG. 10, a method of forming a brake disc arrangement, in accordance with the exemplary embodiments above, includes forming the mounting section 30 to have a plurality of integrally formed radial extensions 105, shown at 210. As described above, the extensions 105 include at least two fins extending in generally opposite directions from the each of the first side 107 and second side 109. In an exemplary embodiment, the extension is formed with two fins 110, 112 extending from the first side 107 and two fins 111, 113 extending from the second side 109, such that the extension is formed having an I-Beam cross-sectional shape. The method also includes casting a metal brake plate section 30 so as to surround the radial extensions 105 with molten metal, shown at 220. The method may further include applying a ceramic coating to the extensions 105, shown at 230.

The benefits from the transitional interface 100 with extensions 105 having fins 110, 111, 112 and 113 and specifically, the exemplary I-Beam design, are intrinsic to the shape of the feature—specifically, the fins 110, 111, 112, 113 that directly contact the interior of the brake plate section 30. The fins 110, 111, 112, 113 may reduce or eliminate the effect of having additional material within the vent passages 36 of the respective joints where an extension 105 is joined between the mounting section 20 and brake section 30.

Prior designs having a brake section mounted to a mounting section in a vent passage of the brake section have used relatively large, solid extensions to connect a mounting section to the braking section. These large, solid extensions create a thermal gradient both during manufacturing and service. In manufacturing, as molten metal cools, these large extensions take longer to solidify resulting in different material properties around the extensions. One key material property affected is the hardness measured on the surface of the braking section.

By incorporating the transitional interface 100 and extensions 105 according to the exemplary embodiments of the present invention, and specifically the I-Beam design, the thermal gradient may be reduced. As a result, the circumferential and radial hardness variation on a surface of the brake plate section 30 may also be significantly reduced.

The thermal gradient during service is similar. As the rotor 10 dissipates the heat from braking, the large solid extensions of prior designs act as heat sinks creating areas of disparate temperature radially and circumferentially around the rotor 10. Over time, these areas of disparate temperature may affect a tribological interface between the brake plate section 30 and a friction material found on a brake caliper (not shown) possibly leading to vehicle vibration and/or harshness during braking.

The transitional interface 100 according to the exemplary embodiments of the present invention may improve braking performance. From a thermal energy perspective, because the fins 110, 111, 112 and 113 of the respective extensions 105 that are in direct contact with the brake plate section 30 are smaller, i.e., less mass and/or volume than the prior larger solid extensions, they become indistinguishable from the neighboring fins/pillars. Thus, the distribution of energy, in all directions, over the surface brake plate section 30 may be as uniform as a conventional full-cast brake disc.

In addition to yielding a more homogeneous temperature distribution across the brake plate section 30, the transitional interface 100 contributes to increased heat dissipation by allowing more air to flow into the vent gaps 121 and 122 as compared to a typical vent-connected brake disc. The gaps 121, 122 between the fins 110, 111, 112, 113 allow air to flow through the joint and into respective vent passage 36 of the brake plate section 30. This additional air flow increases the coefficient of convective heat transfer, thereby, increasing the rate at which heat is dissipated from the rotor 10. The aforementioned vent gaps 121 and 122, along with the thinner center section, also result in a lighter weight part.

This improvement of transitional interface 100 is most relevant for two-piece composite rotors 10 (where the mounting section 20 and brake plate section 30 are produced separately then joined together). However, in other exemplary embodiments and depending on the manufacturing process and brake disc design, this design and associated benefits could also be applicable for conventional full-cast rotors. The transitional interface 100 may improve manufacturability, improves air-flow through the vent passage of the brake plate section 30, allows for more uniform heating and cooling of the brake plate section, and reduces overall part weight.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A brake disc arrangement comprising:
   a mounting section;
   a brake plate section, the brake plate section including a radially inner recess defining a vent passage; and
   a transitional interface positioned between the mounting section and the brake plate section and configured to attach the brake plate section to the mounting section, the transitional interface comprising at least one extension extending radially from an outer circumference of the mounting section, the at least one extension having a cross-sectional configuration shaped as an I-Beam comprising a first tip, a second tip, a third tip and a fourth tip, each of the tips in contact with the brake plate section, the at least one extension having a radially outer distal end extending into the radially inner recess of the brake plate section, the tips defining at least one vent gap therebetween, the vent gap in fluid communication with the vent passage for convective fluid flow proximate a joint between the at least one extension and the brake plate section.

2. The brake disc arrangement of claim 1, wherein the at least one extension includes a radially distal tip portion and the brake plate section is cast to surround the radially distal tip portion.

3. The brake disc arrangement of claim 1, wherein the at least one extension comprises a plurality of extensions, the plurality of extensions being substantially coplanar with respect to each other.

4. The brake disc arrangement of claim 3, wherein said plurality of extensions are integrally formed with the mounting section.

5. A brake disc arrangement comprising:
   a mounting section formed of a metal;
   a transitional interface comprising a plurality of extensions extending radially outward of said mounting section, at least some of the extensions of the plurality of extensions including a first side facing a first axial direction and a second side facing a second axial direction opposite to the first axial direction, the first side having at least two first fins spaced apart and extending in the first axial direction and a first vent gap formed between the at least two first fins, the second side having at least two second fins spaced apart and extending in the second axial direction and a second vent gap formed between the at least two second fins; and
   a brake plate section including a radially inner recess defining a vent passage, the brake plate section attached to the transitional interface, the at least two first fins and the at least two second fins in contact with the brake plate section;
   the plurality of extensions each having a radially outer distal end extending into the radially inner recess of the brake plate section, the first vent gap and the second vent gap in fluid communication with the vent passage for convective fluid flow proximate a joint between the plurality of extensions and the brake plate section.

6. The brake disc assembly of claim 5, wherein said at least some of the extensions include a radially distal tip portion and the brake plate section is cast to surround the radially distal tip portions thereby attaching the brake plate section to the transitional interface.

7. The brake disc assembly of claim 5, wherein the at least two first fins include three first fins spaced apart and extending in the first axial direction, the first vent gap is formed in the spaces between the respective first fins, and the at least two second fins include three second fins spaced apart and extending in the second axial direction, and the second vent gap is formed in the spaces between the respective second fins.

8. A method of forming a brake disc arrangement, the method comprising the steps of:
   forming a mounting section having a plurality of integrally formed radial extensions having an I-beam cross-sectional shape comprising a first tip, a second tip, a third tip and a fourth tip, the tips located at a radially outer distal end of the plurality of extensions and defining at least one vent gap; and
   casting a metal brake plate section with a radially inner recess that surrounds the tips of the radial extensions with molten metal, the metal brake plate section in contact with each of the tips of the radial extensions, the at least one vent gap in fluid communication with the vent passage for convective fluid flow proximate a joint between the plurality of extensions and the brake plate section.

9. The method of claim 8, including applying a ceramic coating to the radial extensions.

* * * * *